United States Patent
Moinuddin et al.

(10) Patent No.: US 11,348,591 B1
(45) Date of Patent: May 31, 2022

(54) DIALECT BASED SPEAKER IDENTIFICATION

(71) Applicant: King Abdulaziz University, Jeddah (SA)

(72) Inventors: Muhammad Moinuddin, Jeddah (SA); Ubaid M. Al-Saggaf, Jeddah (SA); Shahid Munir Shah, Karachi (PK); Rizwan Ahmed Khan, Karachi (PK); Zahraa Ubaid Al-Saggaf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/482,639

(22) Filed: Sep. 23, 2021

(51) Int. Cl.
| | |
|---|---|
| *G10L 17/18* | (2013.01) |
| *G10L 17/04* | (2013.01) |
| *G06N 7/00* | (2006.01) |
| *G10L 25/21* | (2013.01) |
| *G06N 3/08* | (2006.01) |
| *G10L 25/24* | (2013.01) |

(52) U.S. Cl.
CPC ............. *G10L 17/18* (2013.01); *G06N 3/084* (2013.01); *G06N 7/005* (2013.01); *G10L 17/04* (2013.01); *G10L 25/21* (2013.01); *G10L 25/24* (2013.01)

(58) Field of Classification Search
CPC ................................ G10L 17/18; G10L 17/04
See application file for complete search history.

(56) References Cited

U.S. PATENT DOCUMENTS

| | | | |
|---|---|---|---|
| 2008/0059156 A1* | 3/2008 | Han | G10L 15/08 704/207 |
| 2015/0170644 A1* | 6/2015 | Franco | G10L 25/48 704/254 |
| 2016/0248768 A1* | 8/2016 | McLaren | H04L 63/0861 |
| 2017/0140761 A1* | 5/2017 | Seeker-Walker | G10L 17/02 |
| 2019/0108830 A1 | 4/2019 | Pollet | |
| 2020/0020320 A1 | 1/2020 | Lee et al. | |

FOREIGN PATENT DOCUMENTS

CN 110415707 A 11/2019

OTHER PUBLICATIONS

Saleem, S., Subhan, F., Naseer, N., Bais, A., & Imtiaz, A. (2020). Forensic speaker recognition: A new method based on extracting accent and language information from short utterances. Forensic Science International: Digital Investigation, 34, 300982.*

Marwa A. Nasr, et al., "Speaker identification based on normalized pitch frequency and Mel Frequency Cepstral Coefficients", International Journal of Speech Technology, vol. 21, Sep. 17, 2018, pp. 941-951.

(Continued)

*Primary Examiner* — Bryan S Blankenagel
(74) *Attorney, Agent, or Firm* — Oblon, McClelland, Maier & Neustadt, L.L.P.

(57) ABSTRACT

A speaker identification system and method to identify a speaker based on the speaker's voice is disclosed. In an exemplary embodiment, the speaker identification system comprises a Gaussian Mixture Model (GMM) for speaker accent and dialect identification for a given speech signal input by the speaker and an Artificial Neural Network (ANN) to identify the speaker based on the identified dialect, in which the output of the GMM is input to the ANN.

17 Claims, 11 Drawing Sheets

(56) References Cited

OTHER PUBLICATIONS

Zhongxin Bai, et al., "Speaker Recognition Based on Deep Learning: An Overview", arXiv:2012.00931 v2, Apr. 6, 2021, pp. 1-39.
Ma Jiyong, et al., "The supervised learning Gaussian mixture model", Journal of Computer Science and Technology, vol. 13, Sep. 1998, pp. 471-474 (Abstract only).
Basura Fernando et al., "Supervised Learning of Gaussian Mixture Models for Visual Vobcabulary Generation," Pattern Recognition, vol. 45, Issue 2, 2012, pp. 897-907.

* cited by examiner

DIALECT BASED SPEAKER IDENTIFICATION

STATEMENT OF ACKNOWLEDGEMENT

The inventors extend their appreciation to the Deputyship for Research and Innovation, Ministry of Education in Saudi Arabia for funding this research work through the project number 2020-093 and King Abdulaziz University, DSR, Jeddah, Saudi Arabia.

TECHNICAL FIELD

The present disclosure generally relates to a system for speaker identification. In particular, the present disclosure relates to a system for dialect based speaker identification.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Speaker identification is a reliable technique for verifying a person for authentication, as well as for identifying a person. In the case of identifying a person, a person may need to be identified from among hundreds, thousands, or even millions of people in a region, where the people speak the same natural language. In most countries, people may speak different dialects of the language and may speak the language with different accents. An accent is how people pronounce words. A dialect includes the pronunciations, grammar and vocabulary that people use. Thus, in identifying a person based on speech, a person may be among a group of persons that speak the same language and may be in a sub-group based on the accent and/or dialog of the language.

Interest in designing of accent and dialect recognition systems has increased over the past few years and a variety of accent and dialect recognition systems have been proposed. A challenge in designing an accent and dialect recognition system in a presence of accent and dialect related variability is that the search space is very large, and it is difficult to identify a speaker that speaks with a different accent or dialect. This is mainly due to overlapping between inter and intra classes of features. Different methodologies have been used to overcome this problem. For example, accent and dialect recognition systems have been designed as accent and dialect interfaces prior to Voice Processing Systems (VPSs) (for example, speech and speaker recognition systems) to use them as an exact pronunciation dictionary. Such accent and dialect interfaces are used by speech recognizers to adapt acoustic, morphological, and language models of different accents and dialects for minimizing accentual and dialectical mismatches during training and testing processes of VPSs.

However, for designing an accent and dialect recognition system as an exact pronunciation dictionary interface to VPSs, complex feature engineering and sufficient language knowledge is required. Therefore, it is a difficult task to create such pronunciation dictionaries. Further, adding pronunciation variations to the pronunciation dictionaries is another hard task that could lead to substitution errors. Also, adding a large number of pronunciations of each single word increases the computational cost because adding alternatives increases the search space.

Further, the VPSs are vulnerable to different adversarial attacks and are affected by various performance degrading and variability factors such as channel mismatch (i.e., using different channels for enrollment and test data sets), room or space reverberation (decay in sound intensity with time), background noise, and speaker's internal variations such as language (i.e., dialectical variations of a language), emotions, health, vocal efforts, etc. The presence of such performance degrading and variability factors reduces the performance of VPSs, and hence these systems cannot provide robust and accurate recognition. In one example, due to the mismatch of the speaker's accent or dialect during training and testing phases, the performance of VPSs is poor.

There is a need for a speaker identification system that can facilitate in eliminating or minimizing dialect related variability and reducing the learning time for machine learning algorithm by reducing the search space for speaker identification.

SUMMARY

In an exemplary embodiment, a speaker identification system to identify an unknown speaker based on a voice of the speaker is disclosed. The speaker identification system comprises a sound input device for inputting a speech signal of the voice of the unknown speaker; Gaussian Mixture Model (GMM) circuitry configured to perform identification of speaker dialect for the speech signal by way of a mixture of a finite number of Gaussian distributions with unknown parameters; Artificial Neural Network (ANN) circuitry having an input for receiving the identified speaker dialect and configured to identify the unknown speaker based on the identified dialect; and an output for indicating the identified speaker.

In another exemplary embodiment, a speaker identification method to identify an unknown speaker based on a voice of the speaker is disclosed. The speaker identification method comprises inputting, by a sound input device, a speech signal of the voice of the unknown speaker; identifying speaker dialect for the speech signal, by Gaussian Mixture Model (GMM) circuitry; identifying, by Artificial Neural Network (ANN) circuitry, the unknown speaker based on the identified dialect, in which an output of the GMM is input to the ANN; and outputting an indication for the identified speaker.

In a further exemplary embodiment, a non-transitory computer-readable storage medium storing a program, which when executed by a computer performs a speaker identification method to identify an unknown speaker based on a voice of the unknown speaker is disclosed. The non-transitory computer-readable storage medium performs a speaker identification method comprising inputting, by a sound input device, a speech signal of the voice of the unknown speaker; identifying speaker dialect for the speech signal, by Gaussian Mixture Model (GMM) circuitry; identifying, by Artificial Neural Network (ANN) circuitry, the unknown speaker based on the identified dialect, in which an output of the GMM is input to the ANN; and outputting an indication for the identified speaker.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
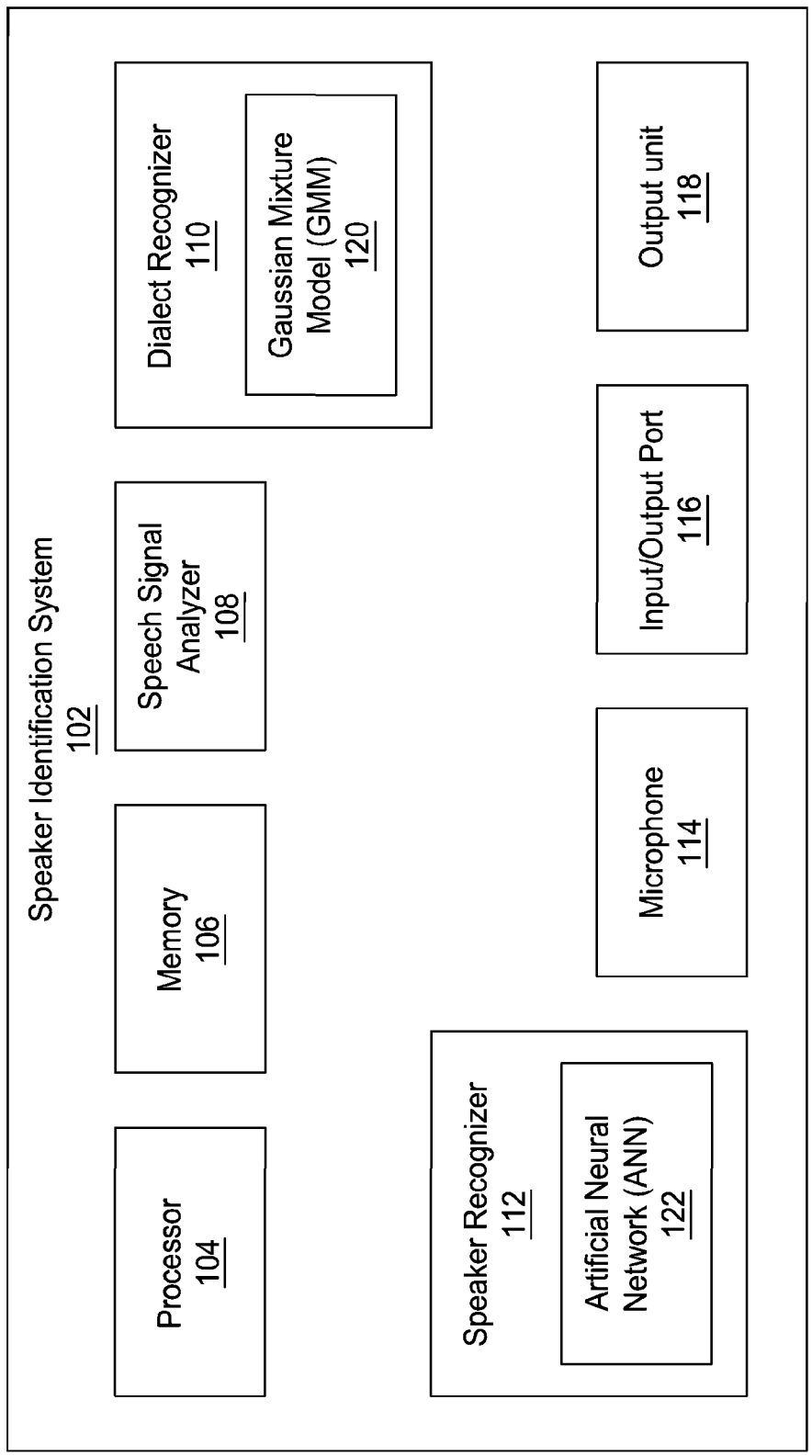
FIG. 1 depicts an architecture of a speaker identification system to identify a speaker based on the speaker's voice, according to aspects of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a speaker identification system to identify a speaker based on the speaker's voice. In an aspect, a supervised machine learning approach is employed for speaker identification.

FIG. 1 depicts an architecture of a speaker identification system 102 to identify a speaker based on the speaker's voice, according to aspects of the present disclosure. The speaker identification system 102 may be any computing device, such as a desktop computer, a laptop, a tablet computer, a smartphone, a smart watch, a mobile device, a Personal Digital Assistant (PDA) or any other computing device. According to aspects of the present disclosure, the speaker identification system 102 may facilitate in processing speech data (for example, a speech signal) input by an unknown speaker to identify dialect of the speaker. The speaker identification system 102 may then identify the speaker based on the information of the identified dialect and the speech data.

According to aspects of the present disclosure, the speaker identification system 102 may include a processor 104, a memory 106, a speech signal analyzer 108, a dialect recognizer 110, a speaker recognizer 112, a microphone 114, an input/output port 116, and an output unit 118.

According to an aspect of the present disclosure, the processor 104 may be implemented as one or more microprocessors, microcomputers, microcontrollers, digital signal processors, central processing units, state machines, logic circuitries, and/or any devices that manipulate signals based on operational instructions. Among other capabilities, the processor 104 may be configured to fetch and execute computer-readable instructions stored in the memory 106. The memory 106 may be coupled to the processor 104 and may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The memory 106 may be capable of storing data and allowing storage locations to be directly accessed by the dialect recognizer 110 and the speaker recognizer 112 for speaker identification.

In an aspect of the present disclosure, the speech signal analyzer 108, the dialect recognizer 110, and the speaker recognizer 112 may be applications or programs communicatively coupled to processing circuitry including processor 104 and memory 106. In some aspects, the speech signal analyzer 108, the dialect recognizer 110, and the speaker recognizer 112, amongst other components, may include routines, programs, objects, components, data structures, etc., which may perform particular tasks or implement particular abstract data types. The speech signal analyzer 108, the dialect recognizer 110, and the speaker recognizer 112 may also be implemented as signal processor(s), state machine(s), logic circuitries, and/or any other device or component that manipulate signals based on operational instructions.

In some aspects, the speech signal analyzer 108, the dialect recognizer 110, and the speaker recognizer 112 may be implemented in hardware circuitry, instructions executed by a processing module, or by a combination thereof. The processing module may comprise a computer, a processor, a state machine, a logic array, or any other suitable devices capable of processing instructions. The processing module may be a general-purpose processor which executes instructions to cause the general-purpose processor to perform the required tasks or, the processing module may be dedicated to perform the required functions. In some aspects, the speech signal analyzer 108, the dialect recognizer 110, and the speaker recognizer 112 may be machine-readable instructions which, when executed by a processor/processing module, perform intended functionalities of the speech signal analyzer 108, the dialect recognizer 110, and the speaker recognizer 112. The machine-readable instructions may be stored on an electronic memory device, hard disk, optical disk, or other machine-readable storage medium or non-transitory medium. In an implementation, the machine-readable instructions may also be downloaded to the storage medium via a network connection. In one or more embodiments, machine-readable instructions may be stored in memory 106.

Also, the dialect recognizer 110 may include Gaussian Mixture Model (GMM) circuitry 120 and the speaker recognizer 112 may include Artificial Neural Network (ANN) circuitry 122. In an aspect of the present disclosure, the GMM 120 may be a probabilistic model for representing normally distributed subpopulations within an overall population of data. The GMM 120 may be parameterized by two values, such as mixture component weights and component means and variances/covariances. The mixture component weights and the component means and variances/covariances may be learned by methods such as Expectation maximization (EM) which is a numerical technique for maximum likelihood estimation. Further, the GMM 120 may be a Supervised Learning GMM (SLGMM) in which parameters of the GMM 120 may be learned by supervised learning using an expectation maximization algorithm. According to aspects of the present disclosure, the SLGMM 120 may be adopted for dialect identification. In particular, in performing clustering via SLGMM, there are two criteria: the cluster purity and the likelihood of the data. In conventional unsupervised clustering, the GMM is designed using the likelihood of the data. However, this approach results in huge clusters which are too general, and each cluster is composed of many classes. On the other hand, the SLGMM as disclosed herein performs supervised learning. Using supervised learning, the available class labels are used to improve cluster purity. The resulting clusters are very discriminative, but the generalization behavior can be weak. In the disclosed SLGMM, a cluster purity-based supervised learning is performed via Expectation Maximization (EM) algorithm to design the SLGMM for dialect recognition.

Figure 2:
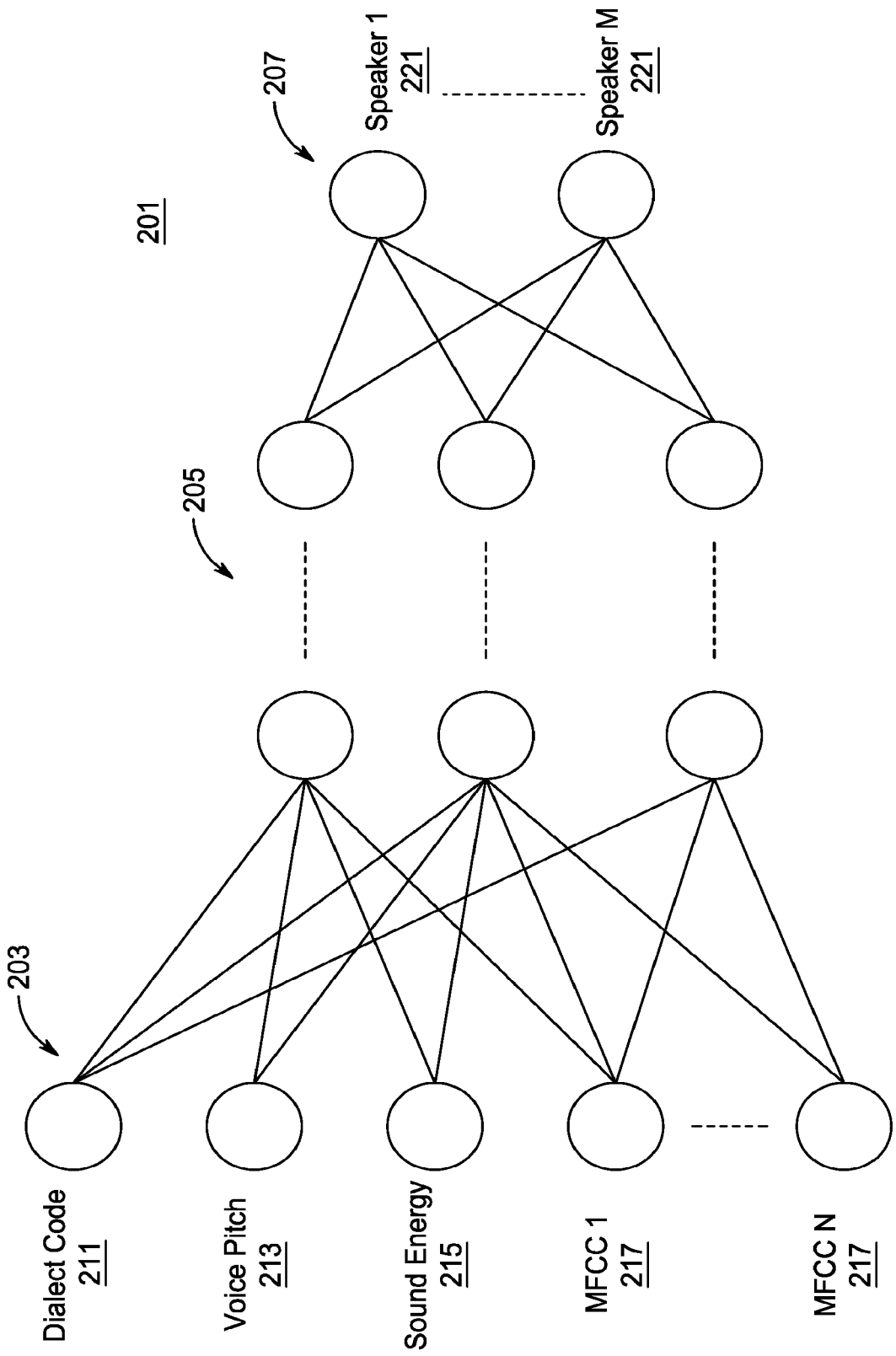
FIG. 2 depicts an exemplary architecture of an artificial neural network for speaker identification according to aspects of the present disclosure.

FIG. 2 is an exemplary architecture of the artificial neural network. The ANN 122 may be a network in which artificial neurons (also known as "nodes") communicate and operate in parallel for achieving some task. According to aspects of the present disclosure, the ANN 122 may be adopted for speaker identification based on the dialect related information. The exemplary architecture may be a multi-layer network 201, including an input layer 203, one or more hidden layers 205, and an output layer 207. The input layer 203 may include a dialect code 211, an input vector of voice pitch 213, sound energy 215, and N coefficients of MFCCs 217. The output layer 207 may include a node 221 for each speaker M.

According to some aspects of the present disclosure, the microphone 114 may be in-built into the speaker identification system 102. The microphone 114 may be enabled to receive a speech signal from a speaker. In one or more embodiments, the microphone 114 may be a basic audio input microphone, a noise-canceling microphone, or any other type of microphone. Further, the input/output port 116 may be a data communication port such as a universal serial bus (USB) port or an audio jack. In an embodiment, the input/output port 116 may be used for connecting an external microphone with the speaker identification system 102. In some examples, the external microphone may be a wireless microphone that may connect with the speaker identification system 102 wirelessly. In an embodiment, the external microphone may receive a speech signal from a speaker and provide the speech signal to the speaker identification system 102 for further processing (i.e., for identification of the speaker). According to aspects of the present disclosure, the output unit 118 may be an audio output device (for example, a speaker) or a display output device (for example, a visual display). In an aspect, the output unit 118 may be configured to output an indication of the identified speaker. The indication of the identified speaker may include one or more of an image of the speaker, a name or other identification information. In some cases, the indication may include personal information such as gender, nationality, race, provided that a privacy policy has been posted and agreed to.

In some aspects of the present disclosure, the speaker identification system 102 may include communication hardware such as a communication interface to communicate with other devices, such as web servers and external repositories. The speaker identification system 102 may also include communication interfaces to facilitate multiple communications with a wide variety of networks and protocol types, including wired networks, for example, LAN, cable, etc., and wireless networks, such as WLAN, cellular, or satellite.

In accordance with the present disclosure, for the purpose of identification of an unknown speaker, the speaker identification system 102 of the present disclosure may be initially trained over a plurality of known speakers. Then the unknown speaker can be identified through the speaker identification system 102. The unknown speaker may be identified based on the training of the speaker identification system 102. If features pertaining to the unknown speaker are not present in the speaker identification system 102, the speaker identification system 102 may classify the unknown speaker to a nearest match that may be available based on the similarity of the features. In some aspects, the speaker identification system 102 may be re-trained if the number of occurrences of such mismatch are more than a predetermined number. According to an aspect of the present disclosure, the process of identifying an unknown speaker is performed in real-time. In some aspects of the present disclosure, the speaker identification system 102 may be a pre-trained system and may or may not be trained in real-time.

The description below describes the procedure to train the speaker identification system 102 for a plurality of known speakers. In an embodiment, the known speakers may be native Pashto speakers of specific regions of Pakistan and Afghanistan, where Pashto is spoken with different dialectal variations. In an aspect of the present disclosure, the speaker identification system 102 may receive an input from a user, such as a system administrator. The system administrator may be a professional (or a team of professionals) who oversees and manages the speaker identification system 102. In an embodiment, the input may include a count of known speakers, respective unique identifiers, and their voice data samples. A unique identifier of a known speaker uniquely defines and identifies the known speaker. For example, the unique identifier may be a name of the known speaker. In an aspect, the voice data samples of the known speakers may be collected using a voice recorder.

According to aspects of the present disclosure, the speech signal analyzer 108 may analyze the voice data samples of the known speakers and extract speech signals. In an embodiment, one speech signal may pertain to one known speaker. Thereafter, the speech signal analyzer 108 may process the speech signals and extract feature vectors for each known speaker. In an embodiment, the speech signal analyzer 108 may process the speech signals in a digital representation. Aspects of the speech signals processing may include signal sampling, analog/digital conversion, and noise filtering. In one or more embodiments, signal sampling may be understood as reduction of a continuous-time signal to a discrete-time signal. Further, analog/digital conversion may be understood as conversion of a continuous-time and continuous-amplitude analog signal to a discrete-time and discrete-amplitude digital signal. In an embodiment, noise filtering may be a process of removing noise from a signal. The speech signals may be processed in several ways which are well known in the art and need not be explained here.

In an embodiment, the feature vectors may include dialect related features and speaker related features. For example, the feature vectors may include speech spectral features and speech prosodic features. The speech spectral features may be speaker related features and speech prosodic features may be dialect related features. According to aspects of the present disclosure, the speech signal analyzer 108 may be configured to extract the speech spectral features of Mel-frequency cepstral coefficient (MFCC). The MFCC may represent the short-term power spectrum of a speech signal by employing a linear cosine transform of a log power spectrum on a nonlinear Mel scale of frequency. In an embodiment, the MFCC may be extracted by employing a linear cosine transform of a log power spectrum on a nonlinear Mel scale of frequency.

The speech signal analyzer 108 may determine MFCCs 217 of a speech signal by taking a Fourier transform of a windowed excerpt of the speech signal;

mapping the powers of the spectrum obtained above onto the Mel scale, using triangular overlapping windows or alternatively, cosine overlapping windows;

taking the logs of the powers at each of the Mel frequencies;

taking the discrete cosine transform of the list of Mel log powers; and subsequently the MFCCs are the amplitudes of the resulting spectrum.

The coefficients of the MFCCs may be input to the Artificial Neural Network, for example, as a vector of values, or a vector of normalized values.

Further, the speech signal analyzer 108 may be configured to extract the speech prosodic features of pitch and energy of speech signal. Voice pitch 213 may be a frequency in a range from low pitch to high pitch. A typical voice pitch may range from a low pitch of about 40 Hz to a high pitch of about 600 Hz. Energy 215 of speech signal is a value of the sound energy and is in the range of frequencies that can be heard by living beings. Sound energy in a volume is defined as the sum of the potential and kinetic energy densities integrated over the volume.

In an aspect of the present disclosure, the speech signal analyzer 108 may group features of the given speech signal using the MFCC features 217, the pitch 213 and Energy 215 features, and the combination of MFCC, Pitch, and Energy Features. The feature vectors for each known speaker may be referred to as training feature vectors, based on which the speaker identification system 102 may be trained so as to identify an unknown speaker from the known speakers. In an aspect, the training feature vectors for the plurality of known speakers may be stored in the memory 106. Further, along with the training feature vectors, class labels of dialects may also be stored in the memory 106. In an embodiment, the training feature vectors may include a feature for a number of dialects, ranging from two to d, where d is a natural number that depends on the range of dialects for a natural language.

According to some aspects of the present disclosure, training of the known speakers may be performed by an external device (i.e., not by the speaker identification system 102). Accordingly, the training feature vectors may be stored in an external database. Further, the external database may be accessed whenever an unknown speaker is to be identified by the speaker identification system 102. Furthermore, the external database may be periodically updated. For example, new data may be added into the external database, existing data in the external database may be modified, or non-useful data may be deleted from the external database.

Figure 3A:
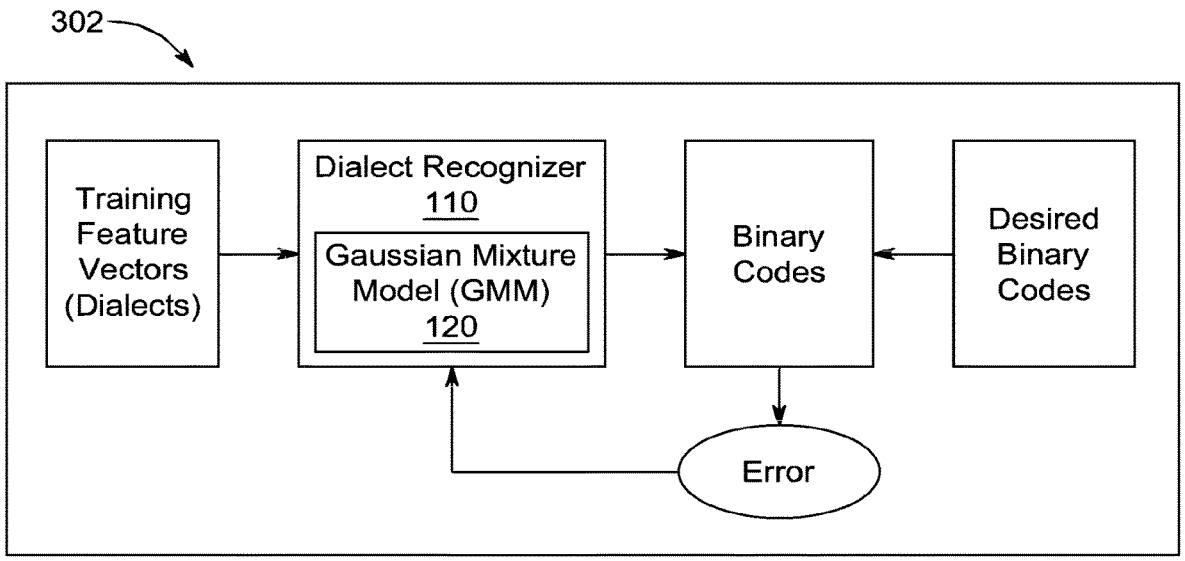
FIGS. 3A and 3B depict processes of training phases of the speaker identification system, according to aspects of the present disclosure.
Figure 3B:
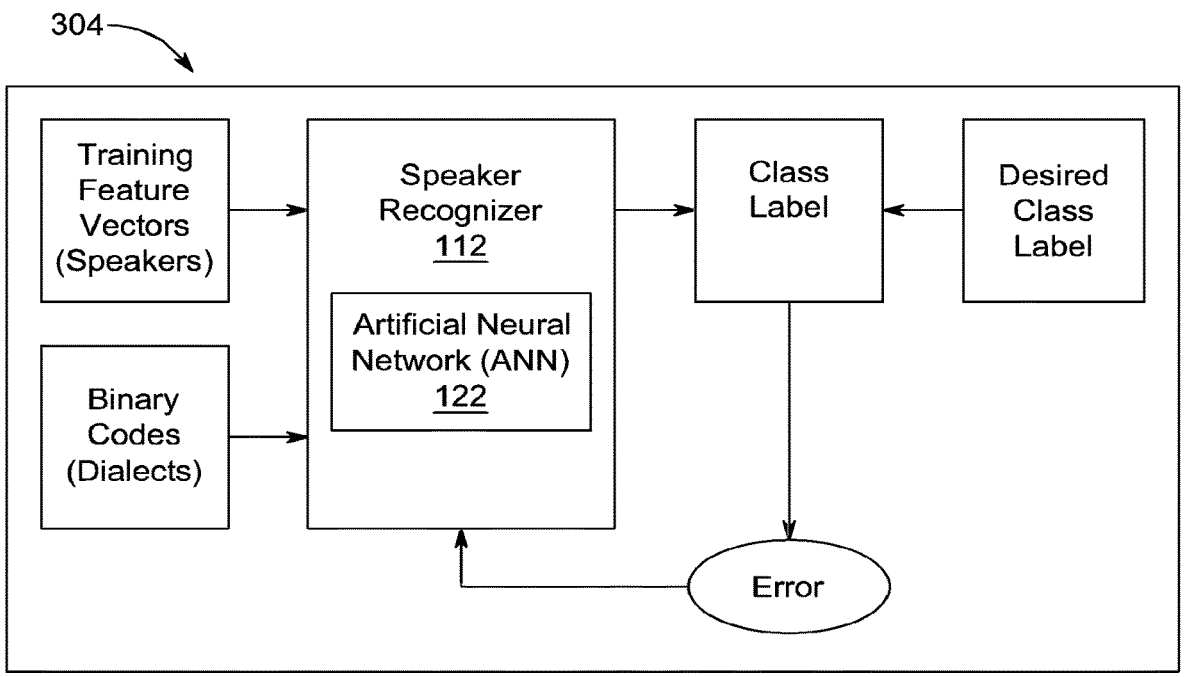

FIGS. 3A and 3B depict processes of training phases of the speaker identification system 102, according to aspects of the present disclosure. In an embodiment, FIG. 3A depicts a process 302 of a training phase of the speaker identification system 102, where the speaker identification system 102 is trained using training feature vectors of dialects. As described in FIG. 3A, the training feature vectors of dialects and class labels of dialects are provided to the dialect recognizer 110 (or a component therein, such as the MINI 120) to train the dialect recognizer 110. Further, the training feature vectors are provided with desired binary codes. The dialect recognizer 110 may generate binary codes for the dialects. In an embodiment, the dialect recognizer 110 may generate three bits binary code for each dialect. Thereafter, error is calculated between the desired binary codes and the generated binary codes for dialects. The calculated error is then fed back to the dialect recognizer 110, and the process is repeated until the error is reached to a desired minimum level. Accordingly, the dialect recognizer 110 gets trained on the collected dialects. In an aspect of the present disclosure, the known speakers are grouped via dialect identification.

According to aspects of the present disclosure, during the training process of the dialect recognizer 110, the feature vectors of each dialect may be used separately to train GMM. In an embodiment, the GMM 120 may perform a training phase in which training feature vectors of speech dialects are input to obtain a trained GMM model. In some aspects of the present disclosure, a separate trained GMM model may be obtained for each dialect. As a result, the trained dialect recognizer 110 may include a plurality of GMMs 120-(1-K), where the plurality of GMMs is collectively referred to as the GMM 120. Accordingly, for each separate dialect, a separate trained GMM model is obtained.

In an embodiment, FIG. 3B depicts a process 304 of a training phase of the speaker identification system 102, where the speaker identification system 102 is trained using training feature vectors of speakers. As depicted in FIG. 3B, the training feature vectors of speakers and desired class labels of speakers are provided to the speaker recognizer 112 (or a component therein, such as the ANN 122) to train the speaker recognizer 112. Further, the binary codes of dialects (obtained from trained dialect recognizer 110) are provided to the speaker recognizer 112. The speaker recognizer 112 may generate class labels for the speakers. Thereafter, error is calculated between the desired class labels and the generated class labels for speakers. The calculated error is then fed back to the speaker recognizer 112, and the process is repeated until the error is reached to a desired minimum level. In an embodiment, the purpose of providing binary codes of dialects along with the training feature vectors of speakers to the speaker recognizer 112 is to train the speaker recognizer 112 not only with the speakers' information but also with the information of their dialects. Accordingly, the speaker recognizer 112 may be trained on the training feature vectors of speakers as well as on the identified dialect code (generated by the dialect recognizer 110) of the speakers' dialects.

According to aspects of the present disclosure, the speaker recognizer 112 (or the ANN 122 may be trained using a back-propagation algorithm. The back-propagation algorithm requires pre-existing training patterns and involves a forward-propagation step followed by a backward-propagation step. In an embodiment, the forward-propagation step may begin by sending input signals through nodes of each layer of the ANN 122. A nonlinear activation function ϕ is applied at each node output. This process repeats until the input signals reach an output layer of the ANN 122 and an output vector is calculated. Further, the backward propagation step may calculate an error vector by comparing the calculated and target outputs. According to an aspect, new sets of weights may be iteratively updated until an overall minimum error is reached, based on equation (1) provided below following weight update for the link between $i^{th}$ node to $j^{th}$ node.

$$w_{ji}^{(l)}(n+1) = w_{ji}^{(l)}(n) + \eta \delta_j^{(l)}(n) y_i^{(l-1)}(n) + \alpha \Delta w_{ji}^{(l)}(n-1), \quad (1)$$

where:

$$\delta_j^{(l)}(n) = \begin{cases} (d_j(n) - y_j^{(L)}(n))\Phi_j'(v_j^{(L)}(n)) & \text{for neuron } j \text{ is output layer } L \\ \Phi_j'(v_j^{(l)}(n)) \sum_k \delta_k^{(l+1)}(n) w_{kj}^{(l+1)}(n) & \text{for neuron } j \text{ is hidden layer } l \end{cases}$$

In the above equation (1), $w_{ji}^{(l)}(n+1)$ represents new weights, $w_{ji}^{(l)}(n)$ represents old weights, $\delta_j^{(l)}(n)$ represents local gradient, $\Delta w_{ji}^{(l)}(n-1)$ represents old change in weights, η represents the learning rate showing the adaptation steps for the learning, α represents momentum coefficient which is in the range [0,1], L represents total number of layers, $v_j^{(L)}(n)$ represents the output of the final layer before activation function, ϕ' represents derivative of the activation function ϕ, and $y_j^{(L)}$ represents output of the $j^{th}$ node at the $L^{th}$ layer.

Figure 4:
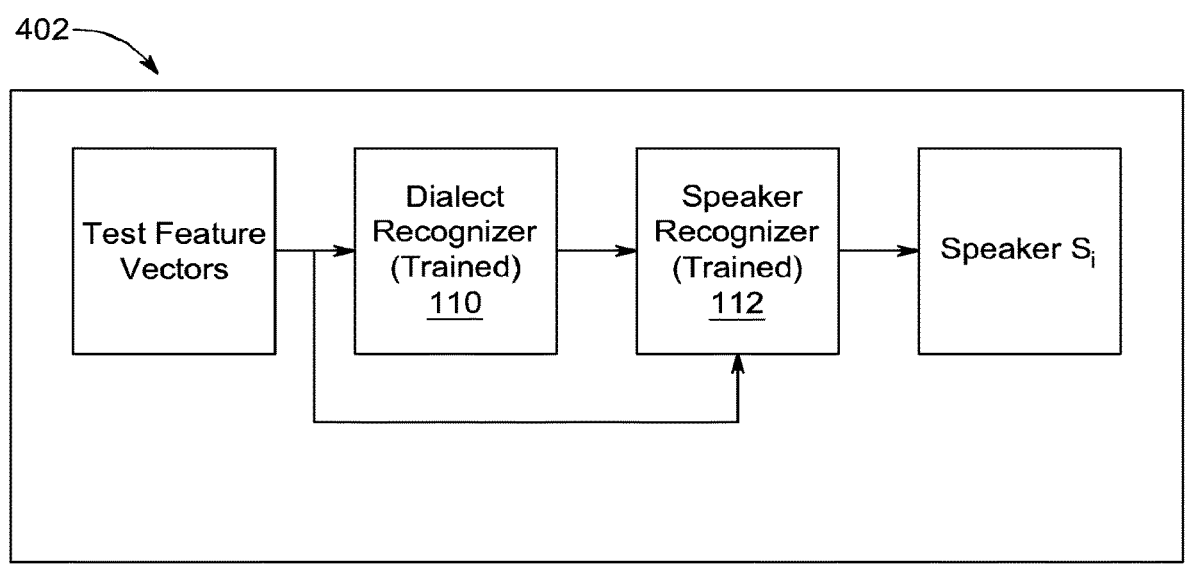
FIG. 4 depicts a process of a testing phase of the speaker identification system according to aspects of the present disclosure.

FIG. 4 depicts a process 400 of a testing phase of the speaker identification system 102, according to aspects of the present disclosure.

According to aspects of the present disclosure, after the training of the dialect recognizer 110 and the speaker recognizer 112, the speaker identification system 102 may be tested against a test feature vector that treats the vector as though it is of an unknown speaker. As described in FIG. 4, the test feature vector of the unknown speaker is provided to both the trained dialect recognizer 110 and the trained speaker recognizer 112. In an aspect of the present disclosure, the trained dialect recognizer 110 may identify the test feature vector as per dialect related information and the trained speaker recognizer 112 may identify the test feature vector as per speaker related information. In the example of FIG. 4, since the output of the trained dialect recognizer 110 is connected as an input to the trained speaker recognizer 112, the unknown speaker is identified based on both speaker related information as well as dialect related information.

Figures 5, 6:
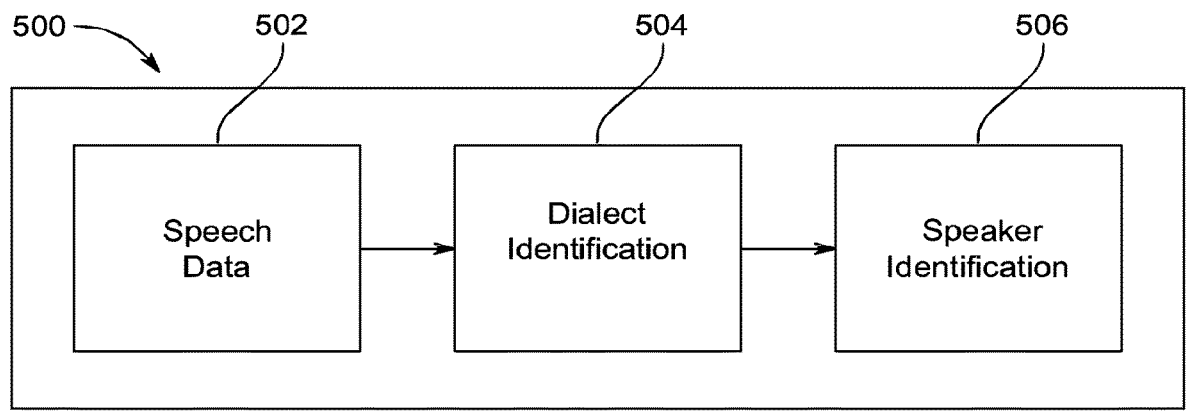
FIG. 5 depicts a flow diagram of the speaker identification system.
FIG. 6 depicts an exemplary confusion matrix, according to aspects of the present disclosure.

According to aspects of the present disclosure, for identification of an unknown speaker in real-time, the speaker identification system 102 may first process speech data input by the unknown speaker to identify the speaker's dialect and then using the information of the identified dialect along with the speech data, the speaker identification system 102 may identify the speaker. In an embodiment, the unknown speaker may be identified based on identified information of the known speakers. A flow diagram 500 of the speaker identification system 102 is illustrated in FIG. 5. At block 502, speech data may be received for the unknown speaker. At block 504, dialect of the unknown speaker is identified based on the speech data. At block 506, the unknown speaker is identified based on the speech data and the identified dialect.

The description below describes the procedure to identify the unknown speaker using the trained speaker identification system 102. Referring again to FIG. 1, the speaker identification system 102 may receive a speech signal input by an unknown speaker. In an embodiment, the speaker identification system 102 may receive the speech signal input by the unknown speaker through the microphone 114. In an aspect of the present disclosure, the speech signal analyzer 108 may extract speech spectral features of Mel-frequency cepstral coefficient (MFCC) from the given speech signal. In an embodiment, the speech signal analyzer 108 may extract the MFCC by employing a linear cosine transform of a log power spectrum on a nonlinear Mel scale of frequency. The speech signal analyzer 108 may also extract speech prosodic features of pitch and energy of speech signals from the given speech signal.

According to aspects of the present disclosure, the GMM 120 of the dialect recognizer 110 may be configured for speaker accent and dialect identification for the given speech signal input by the unknown speaker. In an embodiment, the spectral and prosodic features of the given speech signal may be provided as an input to the GMM 120. In an aspect of the present disclosure, the GMM 120 may process the spectral and prosodic features of the speech signal to identify the dialect of the unknown speaker. Accordingly, the output of the GMM 120 is the identified dialect. Thereafter, the output of the GMM 120 is fed to the ANN 122 of the speaker recognizer 112 (i.e., the output of the GMM 120 is input to the ANN 122). The ANN 122 may be configured to identify the unknown speaker based on the identified dialect, and the prosodic and spectral features. According to an aspect of the present disclosure, the unknown speaker is searched from a set of known speakers of the identified dialect instead of all the known speakers for which the speaker identification system 102 was trained. In an aspect, information about the identified speaker may be provided via the output unit 118. In an embodiment, where the output unit 118 is a display output unit, a name, description of the identified speaker, and/or an image of the identified speaker may be displayed on the output unit 118. Other examples of information/data of the identifier speaker provided via the output unit 118 that are not discussed here are contemplated herein.

According to an aspect of the present disclosure, since the unknown speaker is searched from a set of known speakers of the identified dialect instead of all the known speakers for which the speaker identification system 102 was trained, dialect related variability is significantly reduced. Further, learning complexity of the speaker identification system 102 is minimized as the search space is reduced by embedding dialect information into the speakers' input feature vector. Therefore, the performance of the speaker identification system 102 is enhanced by addressing the variability caused by the dialectical variations of a language.

Although it has been described that the speaker identification system 102 is trained and tested for Pashto language, the speaker identification system 102 can be trained and tested for any natural language.

Examples and Experiments

The following example implementations are provided to illustrate further and to facilitate the understanding of the present disclosure.

Experimental Data and Analysis

To implement the speaker identification system 102, the Pashto language was been selected, and voice data samples were collected from native Pashto speakers of specific regions of Pakistan and Afghanistan where Pashto is spoken with different dialectal variations. A total of 160 speakers were selected, and from each of the 160 speakers, 25 voice samples in the form of short duration sentences were collected. A total of 4000 (25×160) samples were used in the dialect identification stage.

In the dialect identification training stage, 70% of labeled data (training feature vectors) that is labeled with binary codes for dialects was used for training the dialect recognizer 110. Initially, four GGM models were used. The training performance of the dialect recognizer 110 comprising the GMM models with each separate dialect is shown in Table 1 provided below.

TABLE 1

Training performance of the dialect recognizer

| Dialect Label | Total Instances | Training Instances | Training Accuracy (%) |
|---|---|---|---|
| D1 | 625 | 438 | 83.1 |
| D2 | 625 | 438 | 80.3 |
| D3 | 500 | 350 | 86.0 |
| D4 | 625 | 438 | 81.0 |
| D5 | 1000 | 700 | 86.3 |
| D6 | 625 | 438 | 82.8 |

FIG. 6 depicts an exemplary confusion matrix 600 of the trained dialect recognizer 110, according to aspects of the present disclosure. The confusion matrix 600 may indicate the identification of each dialect and correspondence between the target classes along with the X-axis and output classes along the Y-axis. In the example of FIG. 6, according to the confusion matrix 600, the intensity of the true score is high (diagonal) for each dialect.

Figure 7:
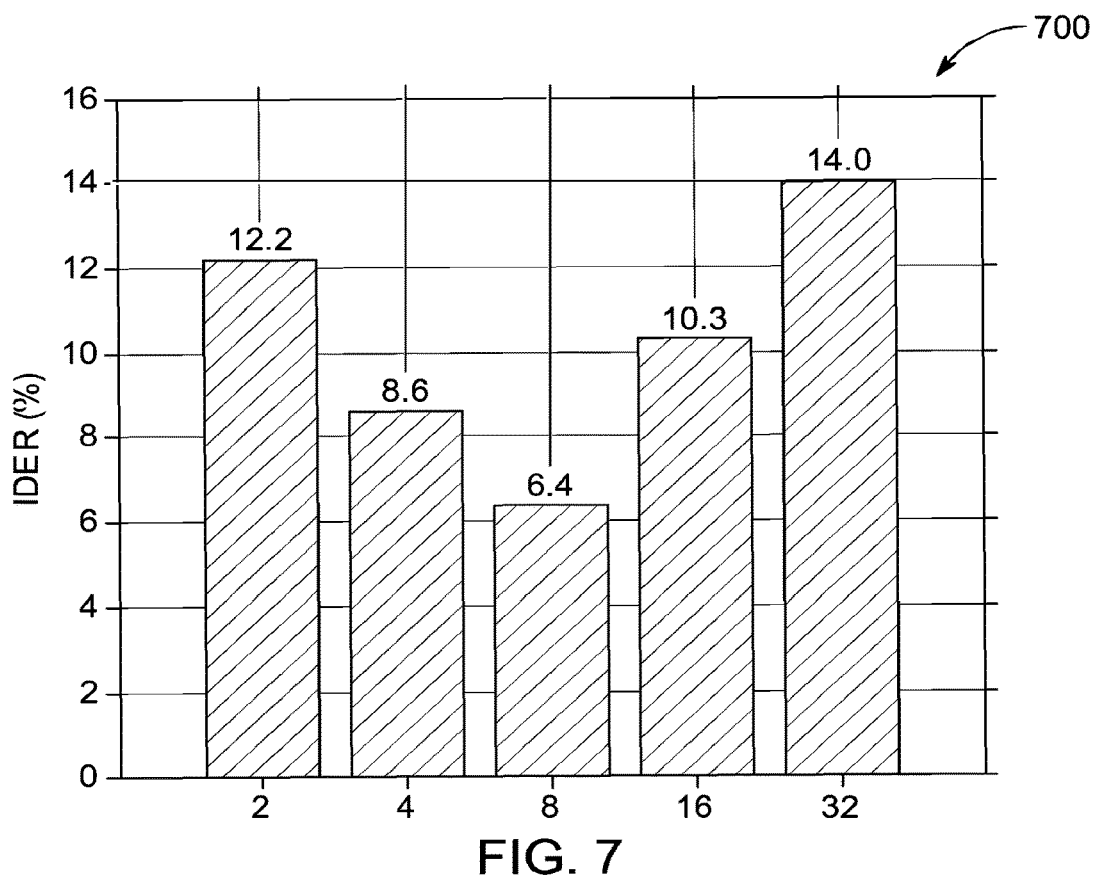
FIG. 7 is a diagram illustrating a performance of a dialect recognizer of the speaker identification system using different mixture components, according to aspects of the present disclosure.

According to aspects of the present disclosure, to further enhance the performance of the dialect recognizer 110 (i.e., the dialect identification performance), the dialect recognizer 110 was trained on varying mixture components. FIG. 7 is a diagram 700 illustrating performance of the dialect recognizer 110 of the speaker identification system 102 using different mixture components against related Identification Error Rate (IDER) on each mixture component. As a result, the component that produces the lowest IDER can be identified and used during the testing process of the speaker identification system 102. As described in FIG. 7, the lower IDER was achieved in dialect identification when eight (8) mixture components were used.

Further, similar to the dialect recognizer 110, the speaker recognizer 112 was also trained using labeled data. However, the data was labeled with speaker labels along with the speakers' dialect labels generated by the trained dialect recognizer 110. Accordingly, the speaker recognizer 112 was not only trained based on speaker labels but also with dialect labels. For the effective training of the speaker recognizer 112, the training feature vectors were used with different percentage splits as well as with varying learning rate values. Training performance of the speaker recognizer 112 with different percentages of the training feature vectors is shown in Table 2 provided below.

TABLE 2

Training performance of the speaker recognizer

| Total Instances | Training Split (%) | Training Instances | Training Accuracy (%) |
|---|---|---|---|
| 4000 | 60 | 2400 | 66.6 |
| 4000 | 70 | 2800 | 72.8 |
| 4000 | 80 | 3200 | 86.6 |
| 4000 | 90 | 3600 | 82.0 |

The above Table 2 describes the training performance of the speaker recognizer 112 with different percentages of training feature vectors having an initial learning rate value=0.1. Table 2 shows that the highest training accuracy is achieved when 80% of the training feature vectors were used for training the speaker recognizer 112.

Figure 8:
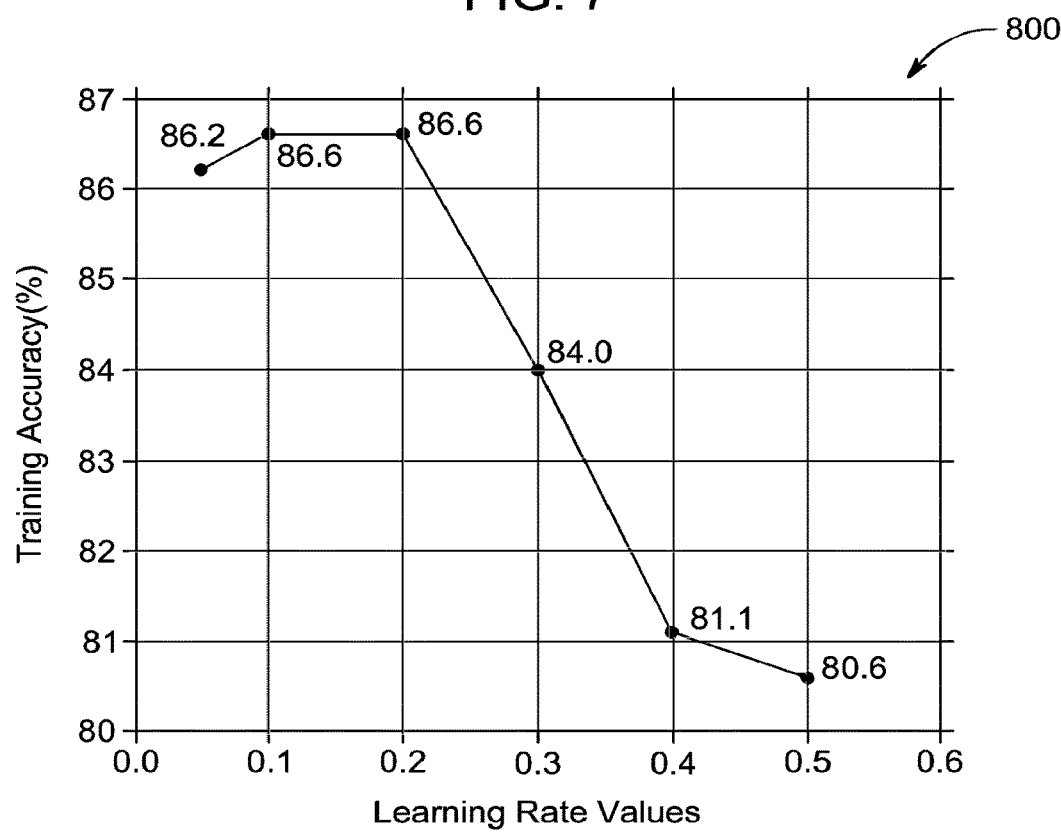
FIG. 8 is a diagram illustrating training performance of a speaker recognizer of the speaker identification system with 80% training split of data and varying learning rate values, according to aspects of the present disclosure.

FIG. 8 is a diagram 800 illustrating training performance of the speaker recognizer 112 of the speaker identification system 102 with 80% training split of data and varying learning rate values, according to aspects of the present disclosure. As described in FIG. 8, learning rate values of 0.1 and 0.2 provide the highest training accuracy.

After the training of the speaker identification system 102, testing of the speaker identification system 102 was performed using a test feature vector. The test feature vector including the speakers' label along with their respective dialect labels (generated by the trained dialect recognizer 110) was provided to the trained dialect recognizer 110 and the trained speaker recognizer 112. In an example, 200 samples from each dialect were included in the test feature vector.

Figure 9:
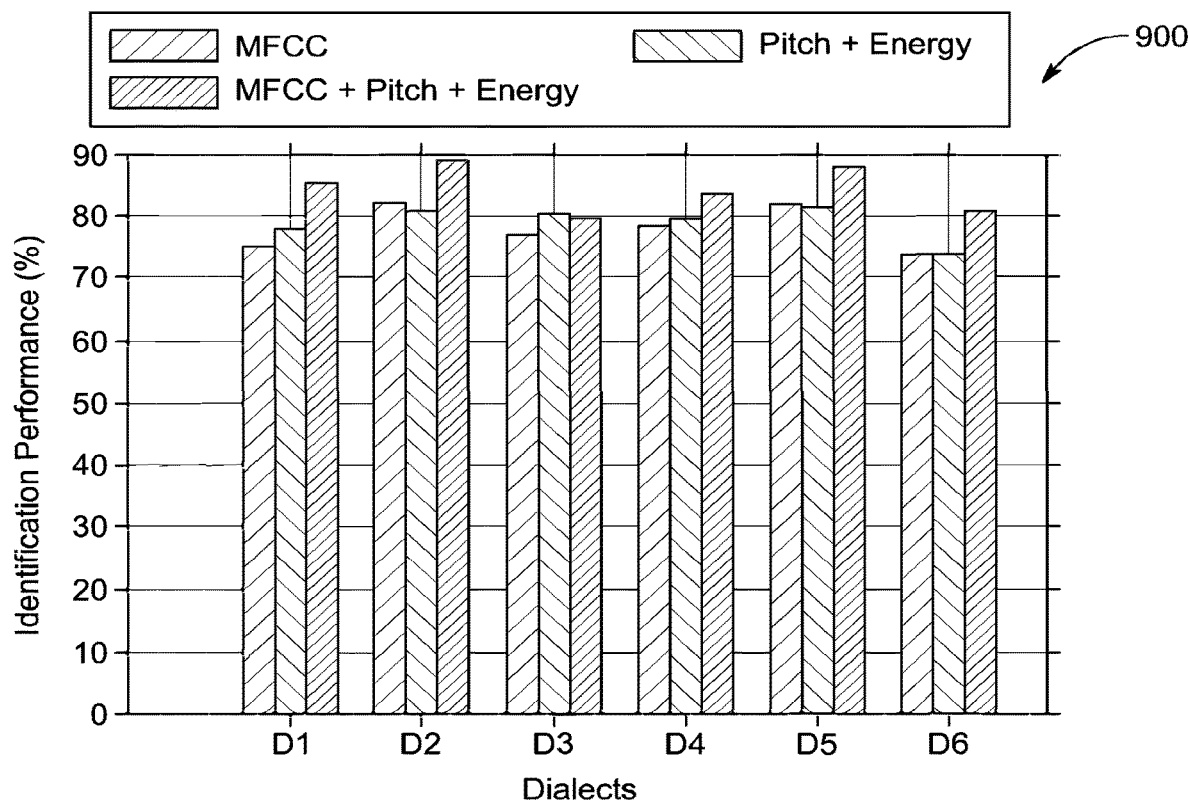
FIG. 9 is a chart indicating a performance of the dialect recognizer with a different set of features, according to aspects of the present disclosure.
Figure 10:
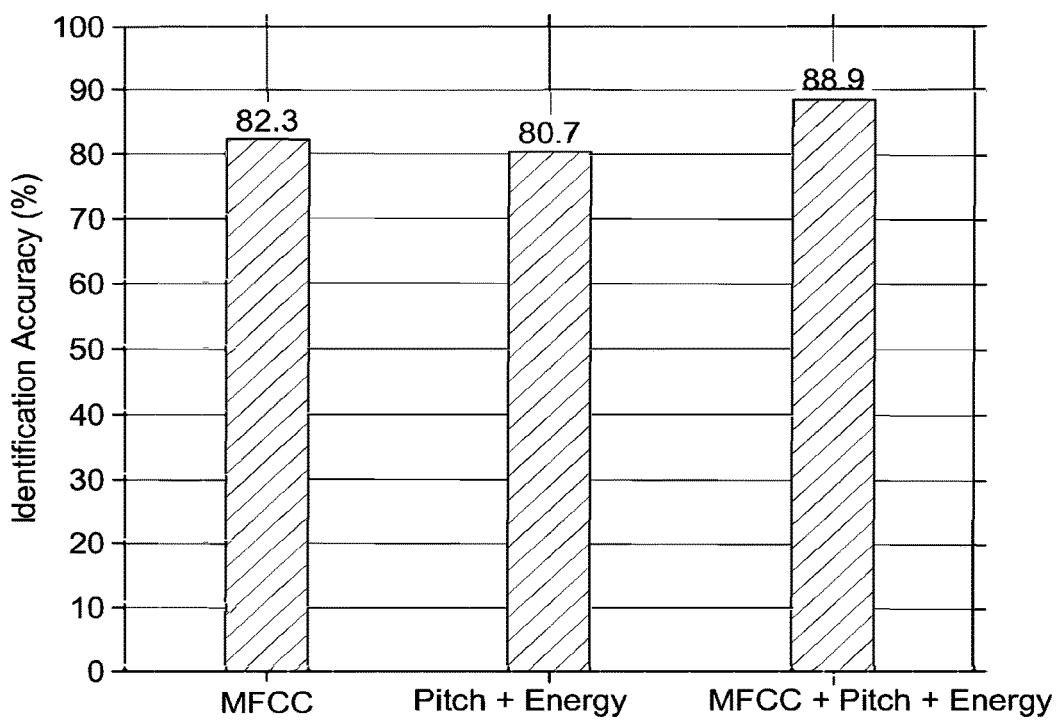
FIG. 10 is a chart indicating a performance of the speaker recognizer with a different set of features, according to aspects of the present disclosure.
Figure 11:
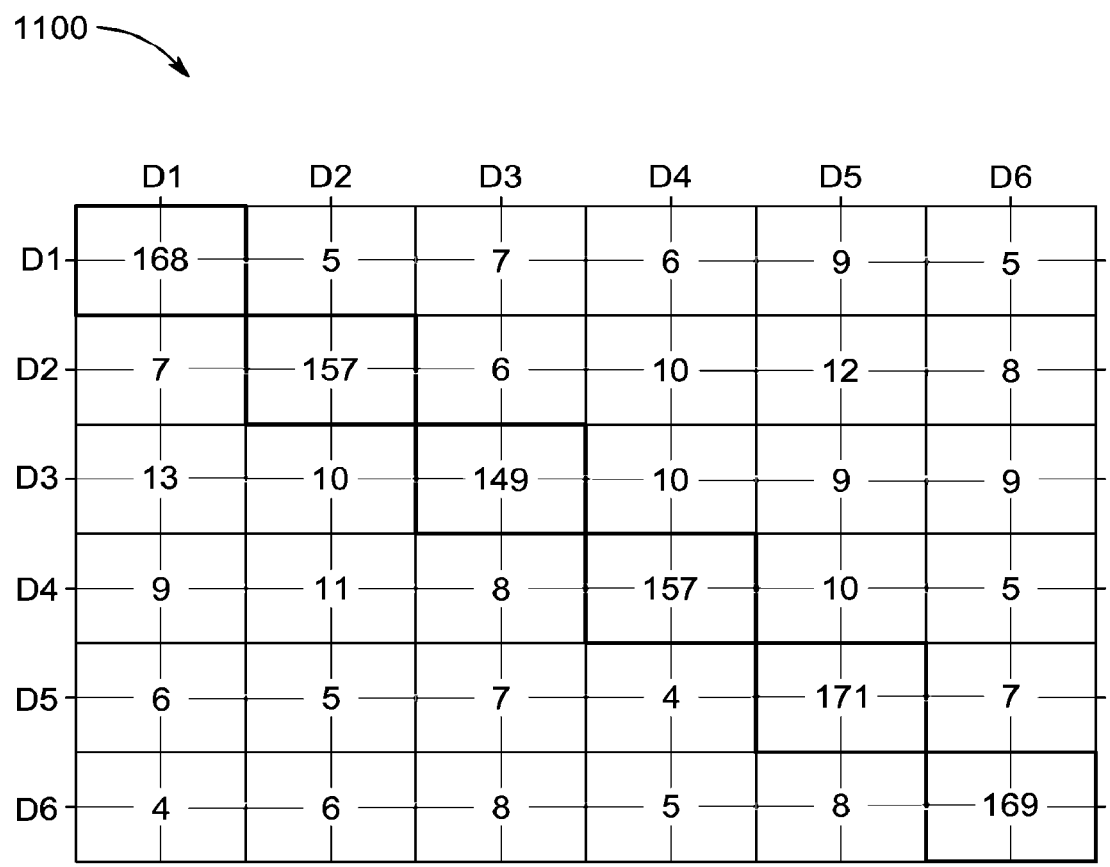
FIG. 11 is a confusion matrix of the dialect recognizer, according to aspects of the present disclosure.
Figure 12:
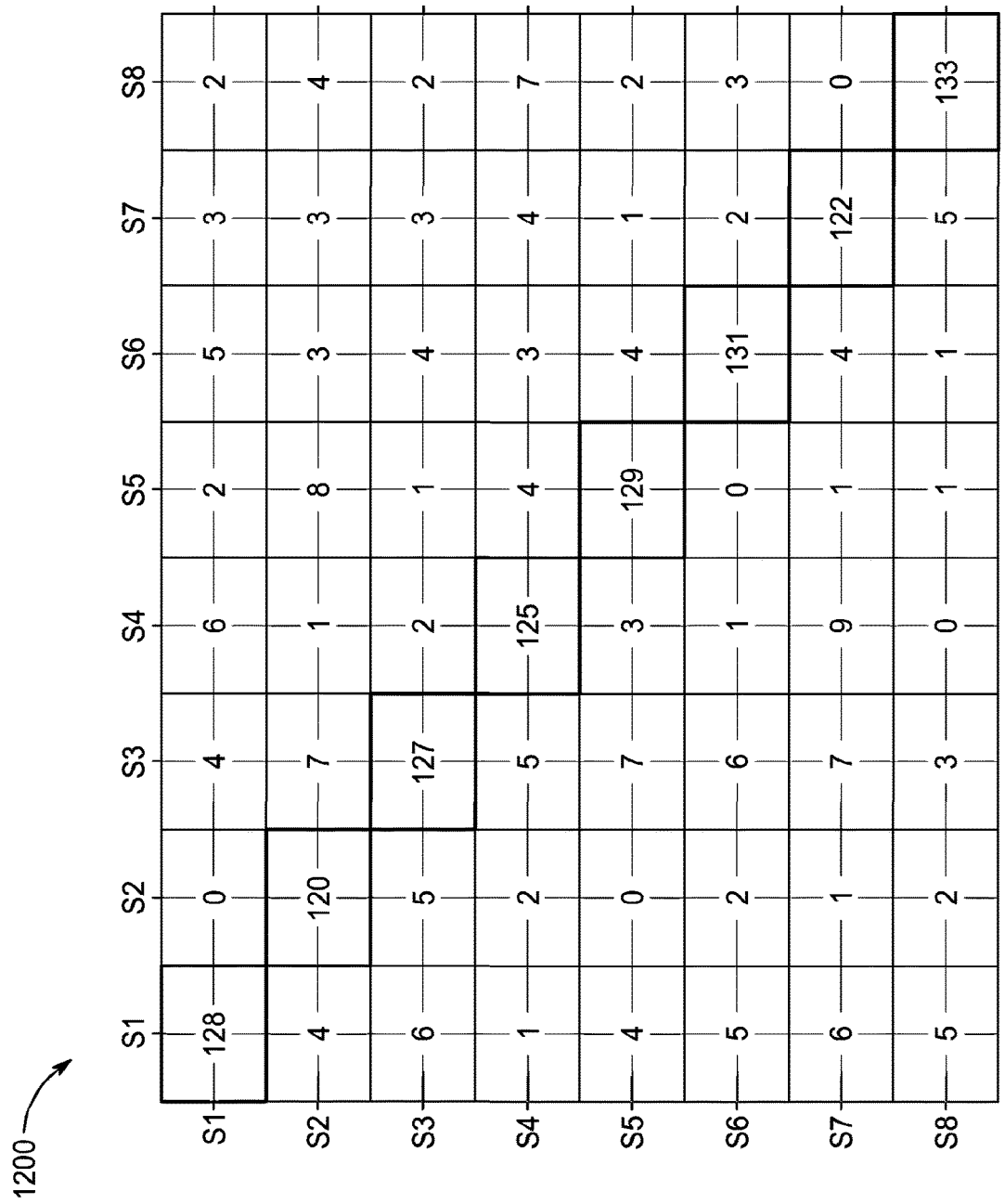
FIG. 12 is a confusion matrix of the speaker recognizer, according to aspects of the present disclosure.

FIG. 9 is a chart 900 indicating a performance of the dialect recognizer 110 with a different set of features, and FIG. 10 is a chart 1000 indicating a performance of the speaker recognizer 112 with a different set of features, according to aspects of the present disclosure. As described in examples of FIG. 9 and FIG. 10, the dialect recognizer 110 and the speaker recognizer 112 achieved the highest identification accuracies when prosodic (pitch and energy) and spectral (MFCC) features were used in combination. Further, the speaker recognizer 112 achieved better performance with spectral (MFCC) features only as compared to the prosodic features, i.e. (pitch+energy). As can be seen in FIG. 10, the identification accuracy achieved using the spectral (MFCC) features was 82.3%, the identification accuracy achieved using the prosodic features, i.e. (pitch+energy) was 80.7%, and the identification accuracy achieved using both the spectral (MFCC) features and the prosodic (pitch and energy) features was 88.9%. FIG. 11 is a confusion matrix 1100 of the dialect recognizer 110 and FIG. 12 is a confusion matrix 1200 of the speaker recognizer 112, according to aspects of the present disclosure.

Figure 13:
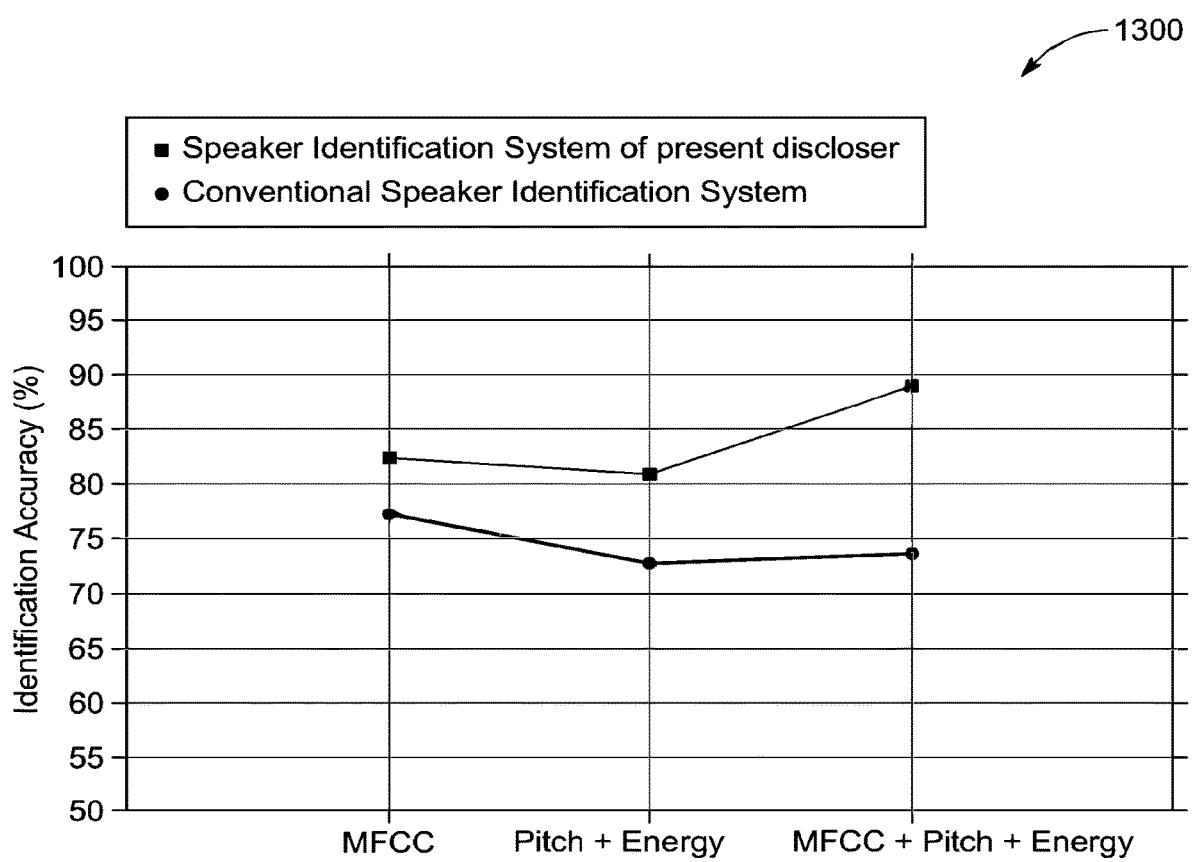
FIG. 13 is a graph of a performance of the speaker identification system of the present disclosure versus performance of conventional speaker identification system, according to aspects of the present disclosure.

To further validate the performance or effectiveness of the speaker identification system 102, another speaker identification system was designed based on same data set that was used for training the speaker identification system 102 and using a traditional methodology where a speaker is identified from all speakers that participated in system training. Further, speaker identification accuracies were compared for both the speaker identification system 102 and the traditionally designed speaker identification system. FIG. 13 is a graph 1300 of a performance of the speaker identification system 102 of the present disclosure versus performance of a speaker identification system designed using a traditional methodology (hereinafter referred to as conventional speaker identification system). FIG. 13 provides the comparison of recognition accuracies achieved by the speaker identification system 102 of the present disclosure and the conventional speaker identification system. As shown in FIG. 13, the speaker identification system 102 outperformed the conventional speaker identification system in identifying speakers by showing a significant improvement (7.5% increase) in identification accuracy. Furthermore, the speaker identification system 102 is time efficient as it consumes 39% less time in identifying a speaker as compared to the conventional speaker identification system. The comparison was performed on a laptop having a core i7 processor. The speaker identification system 102 performed speaker identification in an average time of 62 seconds, while the conventional speaker identification system performed speaker identification in an average time of 158 seconds.

In an embodiment, because the dialectical information (information) is embedded in the speakers' features vector during testing, the speaker identification system 102 identifies an unknown speaker using 1:n matching, where n is the number of speakers in the identified dialect. In the embodiment, during training, the other output nodes for speakers for other dialects may be given a value of zero. Accordingly, the complexity of the speaker identification system 102 is minimized. On the other hand, the conventional speaker identification system identifies an unknown speaker using 1:N matching, where N is the total number of speakers for which the conventional speaker identification system was trained, and n<<N.

Figure 14:
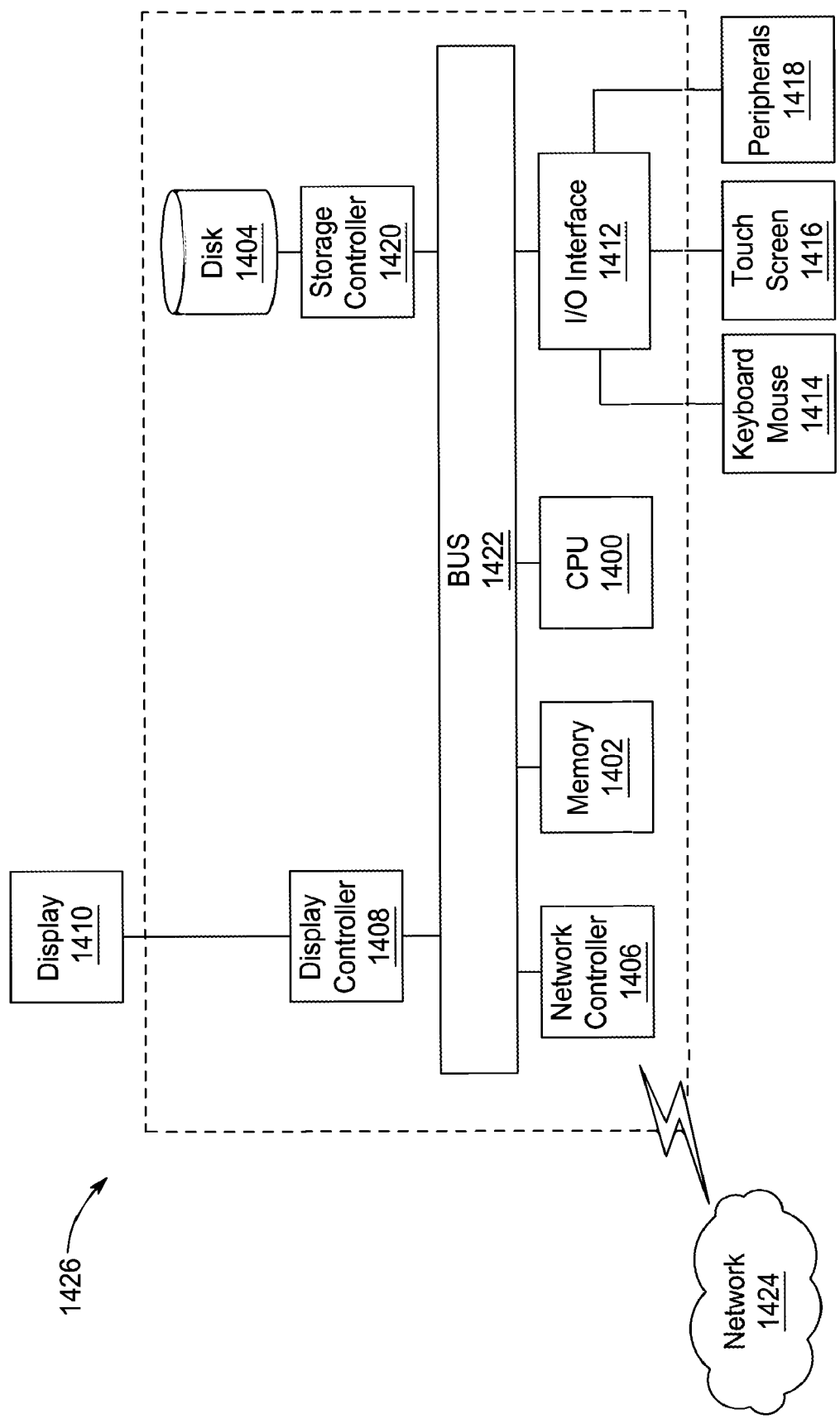
FIG. 14 is a diagram of a general purpose computer for implementing the speaker identification system, according to aspects of the present disclosure.

Next, further details of the hardware description of the computing environment according to exemplary embodiments is described with reference to FIG. 14. FIG. 14 is a diagram of a general purpose computer 1426 for implementing the speaker identification system 102, according to aspects of the present disclosure.

The computer 1426 includes a CPU 1400 which performs the processes described herein. The process data and instructions may be stored in memory 1402. These processes and instructions may also be stored on a storage medium disk 1404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1426 communicates, such as a server or computer.

Further, one or more embodiments may be provided as a utility application, background daemon, or component of an operating system, or combination thereof, executing in conjunction with CPU 1400 and an operating system such as Microsoft® Windows®, UNIX®, Oracle® Solaris, LINUX®, Apple macOS® and other systems known to those skilled in the art.

In order to achieve the computer 1426, the hardware elements may be realized by various circuitry elements, known to those skilled in the art. For example, CPU 1400 may be a Xenon® or Core® processor from Intel Corporation of America or an Opteron® processor from AMD of America, or may be other processor types that would be recognized by one of ordinary skill in the art. Alternatively, the CPU 1400 may be implemented on an FPGA, ASIC, PLD or using discrete logic circuits, as one of ordinary skill in the art would recognize. Further, CPU 1400 may be implemented as multiple processors cooperatively working in parallel to perform the instructions of the inventive processes described above.

The computer 1426 in FIG. 14 may also include a network controller 1406, such as an Intel Ethernet PRO network interface card from Intel Corporation of America, for interfacing with network 1424. As can be appreciated, the network 1424 can be a public network, such as the Internet, or a private network such as LAN or WAN network, or any combination thereof and can also include PSTN or ISDN sub-networks. The network 1424 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1426 further includes a display controller 1408, such as a NVIDIA® GeForce® GTX or Quadro® graphics adaptor from NVIDIA Corporation of America for interfacing with display 1410, such as a Hewlett Packard® HPL2445w LCD monitor. A general purpose I/O interface 1412 interfaces with a keyboard and/or mouse 1414 as well as an optional touch screen panel 1416 on or separate from display 1410. General purpose I/O interface also connects to a variety of peripherals 1418 including printers and scanners, such as an OfficeJet® or DeskJet® from Hewlett Packard®.

The general purpose storage controller 1420 connects the storage medium disk 1404 with communication bus 1422, which may be an ISA, EISA, VESA, PCI, or similar, for interconnecting all of the components of the computer 1426. A description of the general features and functionality of the display 1410, keyboard and/or mouse 1414, as well as the display controller 1408, storage controller 1420, network controller 1406, and general purpose I/O interface 1412 is omitted herein for brevity as these features are known.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein. For example, for large numbers of persons that may be identified using the disclosed speaker identification system, the number of persons may exceed the memory and/or processing capacity of a single computer system. In such case, network connected servers, a data center, or a cloud service may be used to implement the dialect recognizer 110 and speaker recognizer 112 components of the speaker identification system 102. Components such as the microphone 114, speech signal analyzer 108, output unit 118, may be included in one or more user devise that are configured to communicate with each other, as well as communicate with the servers, data center, or cloud service.

Numerous modifications and variations of the present disclosure are possible in light of the above teachings. It is therefore to be understood that within the scope of the appended claims, the invention may be practiced otherwise than as specifically described herein.

The invention claimed is:

1. A speaker identification system to identify an unknown speaker based on a voice of the speaker, comprising:
a sound input device for inputting a speech signal of the voice of the unknown speaker;
Gaussian Mixture Model (GMM) circuitry configured to perform identification of speaker dialect for the speech signal by way of a mixture of a finite number of Gaussian distributions with unknown parameters;
Artificial Neural Network (ANN) circuitry having an input for receiving the identified speaker dialect and configured to identify the unknown speaker based on the identified dialect together with the speech signal; and
an output for indicating the identified speaker,
wherein an input to the Gaussian Mixture Model circuitry includes Mel-frequency cepstral coefficients of the speech signal, and pitch and energy of the speech signal and is also the input to the Artificial Neural Network circuitry, and
wherein the Artificial Neural Network circuitry is trained with a combination of a dialect code obtained as the output from the Gaussian Mixture Model circuitry, the Mel-frequency cepstral coefficients of the speech signal, and the pitch and the energy of the speech signal.

2. The speaker identification system of claim 1, wherein the Gaussian Mixture Model circuitry is configured to perform dialect identification with spectral and prosodic features of the speech signal as the input speech signal and the output of the GMM is the identified dialect.

3. The speaker identification system of claim 1, further comprising a speech signal analyzer configured to extract speech spectral features of Mel-frequency cepstral coefficient from the speech signal.

4. The speaker identification system of claim 1, further comprising a speech signal analyzer configured to extract speech prosodic features of pitch and energy of speech signals from the speech signal.

5. The speaker identification system of claim 1, wherein the Gaussian Mixture Model circuitry is configured to learn parameters by supervised learning using an expectation maximization algorithm.

6. The speaker identification system of claim 3, wherein the speech signal analyzer is configured to extract Mel-frequency cepstral coefficients by employing a linear cosine transform of a log power spectrum on a nonlinear Mel scale of frequency.

7. The speaker identification system of claim 2, wherein the GMM circuitry is configured to perform dialect identification by grouping the features of the speech signal using (1) Mel-frequency cepstral coefficient (MFCC) features only (2) pitch and Energy features and (3) a combination of MFCC, Pitch, and Energy Features.

8. The speaker identification system of claim 1, wherein
the GMM circuitry is configured to perform a training phase in which training feature vectors of a plurality of speech dialects are input to obtain a trained GMM model,
the trained GMM model generates binary codes for the plurality of speech dialects, and
the ANN circuitry is configured to receive training speech feature vectors along with generated binary codes, an error between desired speaker and generated speaker is then utilized for training an ANN model using a back-propagation algorithm.

9. A speaker identification method to identify an unknown speaker based on a voice of the speaker, the method comprising:
inputting, by a sound input device, a speech signal of the voice of the unknown speaker;
identifying speaker dialect for the speech signal, by Gaussian Mixture Model (GMM) circuitry;
identifying, by Artificial Neural Network (ANN) circuitry, the unknown speaker based on the identified dialect, in which an output of the GMM is input to the ANN;
outputting an indication for the identified speaker; and
inputting to the Gaussian Mixture Model as well as to the Artificial Neural Network Mel-frequency cepstral coefficients of the speech signal, and pitch and energy of the speech signal, and training the Artificial Neural Network circuitry with a combination of a dialect code obtained as the output from the Gaussian Mixture Model circuitry, the Mel-frequency cepstral coefficients of the speech signal, and the pitch and energy of the speech signal.

10. The speaker identification method of claim 9, wherein the identifying the speaker dialect, by the Gaussian Mixture Model circuitry, includes
using spectral and prosodic features of the speech signal as the input speech signal and the output of the GMM is the identified dialect.

11. The speaker identification method of claim 9, further comprising:
extracting, by a speech signal analyzer, speech spectral features of Mel-frequency cepstral coefficient from the speech signal.

12. The speaker identification method of claim 9, further comprising:
extracting, by a speech signal analyzer, speech prosodic features of pitch and energy of speech signals from the speech signal.

13. The speaker identification method of claim 9, further comprising:
learning parameters of the Gaussian Mixture Model circuitry by supervised learning using an expectation maximization algorithm.

14. The speaker identification method of claim 11, further comprising:
extracting, by the speech signal analyzer, Mel-frequency cepstral coefficients by employing a linear cosine transform of a log power spectrum on a nonlinear Mel scale of frequency.

15. The speaker identification method of claim 10, wherein the dialect identification is performed by grouping the features of the speech signal using one of (1) Mel-frequency cepstral coefficient (MFCC) features only (2) pitch and Energy features and (3) a combination of MFCC, Pitch, and Energy Features.

16. The speaker identification method of claim 9, further comprising:

performing, by the GMM circuitry, a training phase in which training feature vectors of a plurality of speech dialects are input to obtain a trained GMM model;

generating, by the trained GMM model, a binary code for a speech dialect;

receiving, by the ANN circuitry, training speech feature vectors along with the generated binary code; and training an ANN model using a back-propagation algorithm based on an error between a known speaker and generated speaker.

17. A non-transitory computer-readable storage medium storing a program, which when executed by a computer performs a speaker identification method to identify an unknown speaker based on a voice of the speaker, comprising:

performing, by Gaussian Mixture Model (GMM) circuitry, a supervised training phase in which training feature vectors of a plurality of speech dialects are input to obtain a trained GMM model;

generating, by the trained GMM model, binary codes for the plurality of speech dialects;

receiving, by Artificial Neural Network (ANN) circuitry, training speech feature vectors along with the generated binary codes; and training an ANN model using a back-propagation algorithm, based on the training speech feature vectors along with the generated binary codes and based on an error between a known speaker and generated speaker;

inputting, by a sound input device, a speech signal of the voice of the unknown speaker;

identifying speaker dialect for the speech signal, by the Gaussian Mixture Model (GMM) circuitry;

identifying, by the Artificial Neural Network (ANN) circuitry, the unknown speaker based on the identified dialect, in which an output of the GMM is input to the ANN; and outputting an indication for the identified speaker.

* * * * *